United States Patent
Schuneman et al.

(10) Patent No.: US 6,343,145 B1
(45) Date of Patent: *Jan. 29, 2002

(54) COLOR IMAGING SYSTEM AND PROCESS WITH HIGH-SPEED RENDERING

(75) Inventors: Thomas A. Schuneman, Arlington, MA (US); David John Earl, Fulbourn; William Craig Revie, Over, both of (GB); Andrew Masia, Newburyport, MA (US)

(73) Assignee: Harlequin Group Ltd., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/102,265

(22) Filed: Jun. 22, 1998

(51) Int. Cl.[7] .................................................. G06K 9/00
(52) U.S. Cl. ......................... 382/162; 358/518; 358/525
(58) Field of Search ................................. 382/162, 300, 382/302; 358/518, 520, 523, 524, 525, 224; 364/732, 577, 853; 345/154, 186; 395/131, 514

(56) References Cited

U.S. PATENT DOCUMENTS 4,275,413 A * 6/1981 Sakamoto et al. ........... 358/525
5,610,732 A * 3/1997 Komatsu ..................... 358/525
5,862,253 A * 1/1999 Schnneman et al. ........ 382/162

OTHER PUBLICATIONS

Dennis Bragg, 1.4 A Simple Color Reduction Fiter, Graphics Gems II, Copyright 1992 by American Press, Inc., 1992.*

* cited by examiner

Primary Examiner—Samir Ahmed
(74) Attorney, Agent, or Firm—Darby & Darby (57) ABSTRACT

A system for processing images includes an image file subsystem providing a source signal representing an input image; a color transformation subsystem coupled to the image file subsystem and accepting as input the source signal and producing a target signal therefrom, and an image forming subsystem coupled to the color transformation subsystem and forming a physical manifestation of the input image in response to the target signal, the color transformation subsystem being configured to establish a memory "cube" area representative of possible source signals, to define a sub-cube portion of the memory area as representative of the source signal; to determine possible target signals corresponding to the sub-cube portion; and to determine the target signal responsive to the possible target signals. If interpolation is found to be accurate for a mini-cube portion of the sub-cube, truncation or interpolation are used to derive the target signal; otherwise, the target signal is determined directly.

10 Claims, 5 Drawing Sheets

COLOR IMAGING SYSTEM AND PROCESS WITH HIGH-SPEED RENDERING

This patent application is a continuation of Ser. No. 08/643,186 filed on May 3, 1996 and issed as U.S. Pat. No. 5,862,253 on Jan. 19, 1999. This prior application is hereby incorporated herein by reference, in its entirety.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

The computer program listing appendix submitted on compact disc in duplicate in file CSB1056 is incorporated by reference.

BACKGROUND OF THE INVENTION

This invention relates generally to image-forming systems and processes, and specifically to systems and processes involving the transformation of color image signals from one form into another.

Modern imaging systems used in the pre-press, printing, computer graphics, and related industries make extensive use of color image information. This information is sometimes derived from scanning photographs and other "hardcopy" images, and is in other instances obtained directly from a computer-generated graphics file.

Various sources of color images produce digital data files in which color is specified in various ways. Furthermore, different types of output devices, for instance computer monitors, color ink-jet and laser printers, and imagesetters, are designed to operate using various different standards for defining colors.

One common component of an image-forming system is a page description language interpreter, for instance as produced by Adobe Systems Incorporated for interpretation of the PostScript® page description language. One function of apparatus employing such interpreters is to accept, as input, signals corresponding to imaging commands written in a page description language and to produce, as output, signals recognizable by an imaging engine, such as a laser print engine of a conventional color laser printer. Further pertinent background is presented in the POSTSCRIPT LANGUAGE REFERENCE MANUAL, SECOND EDITION, Adobe Systems Inc., pp. 176–192, 295–302 (Addison-Wesley 1990), the contents of which are incorporated herein by reference.

In performing the transformation from input to output in such apparatus, it is often necessary to convert signals representing a color from one format to another format. Such formats are sometimes referred to as color spaces. For example, a color produced by a computer graphics workstation may initially be specified as separate Red, Green, and Blue values in an "RGB" color space. For printing of a corresponding image, it may be necessary to transform a color signal from the RGB color space to, for example, the "CMYK" color space for printing using Cyan, Magenta, Yellow, and Black (or "Key") colorants. Intermediate color signal transformations also are often called for in order to provide certain benefits, such as the ability to work with a number of different image source devices and image forming devices.

Two general approaches are conventionally used for such color space transformation. In one approach, a mathematical relationship between the input-color space and the output color space is determined, and a computer program is implemented to compute output color space signal values from any given set of input color space signal values.

A second approach is to use a conventional "look-up table" stored in computer memory that, for particular values of input color space signals, provides corresponding values of output color space signals. In some instances, more possible inputs exist than would be practical to provide as look-up table inputs. "Sparse" look-up tables, with interpolation for in-between values, are typically used in such cases.

The processing required to perform such color space transformations using conventional techniques is computationally intensive and requires a relatively large amount of computer memory, which in turn requires the use of more expensive equipment to perform such processing.

It would be desirable for an image processing system to process color transformations in a manner that is more efficient than possible with the known techniques. No known solution adequately addresses the need for a simple, flexible, inexpensive system and process for color transformations.

SUMMARY OF THE INVENTION

In accordance with the present invention, a system (100) for processing images includes an image file subsystem (201) providing a source signal representing an input image; a color transformation subsystem (202) operatively coupled to the image file subsystem and accepting as input the source signal and producing a target signal therefrom, and an image forming subsystem (203) operatively coupled to the color transformation subsystem and forming a physical manifestation of the input image in response to the target signal, the color transformation subsystem being configured to establish a memory "cube" area representative of possible source signals, to define a sub-cube portion of the memory area as representative of said source signal; to determine possible target signals corresponding to the sub-cube portion; and to determine the target signal in response to the possible target signals.

Also in accordance with the present invention, the color transformation subsystem is further configured to divide the sub-cube portion into mini-cube portions and to determine possible target signals corresponding to each mini-cube portion.

Further in accordance with the present invention, the color transformation subsystem is configured to determine an accuracy of interpolation for each of the mini-cubes.

Still further in accordance with the present invention, the color transformation subsystem is configured to determine the target signal in a first manner if an accuracy of interpolation exceeds a predetermined threshold and to determine the target signal in a second manner if the accuracy of interpolation does not exceed a predetermined threshold. The first manner may include truncation or interpolation.

Yet further in accordance with the present invention, the color transformation subsystem is configured to add a noise signal to the source signal and truncate the resulting signal.

In another aspect of the invention, a method of processing a color image source signal to produce a target signal includes establishing a memory area representative of possible source signals; defining a sub-cube portion of the memory area as representative of a source signal; determining possible target signals corresponding to the sub-cube portion; and determining the target signal in response to the possible target signals.

Also in accordance with this aspect of the present invention, the method further includes dividing the sub-cube portion into mini-cube portions and determining possible target signals corresponding to each mini-cube portion.

Further in accordance with this aspect of the present invention, method includes determining an accuracy of interpolation for each of the mini-cubes.

Still further in accordance with this aspect of the present invention, the method includes determining the target signal in a first manner if an accuracy of interpolation exceeds a predetermined threshold and determining the target signal in a second manner if an accuracy of interpolation does not exceed a predetermined threshold. The first manner may include truncation or interpolation.

Yet further in accordance with this aspect of the present invention, the method includes adding a noise signal to the source signal and truncating the resulting signal.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
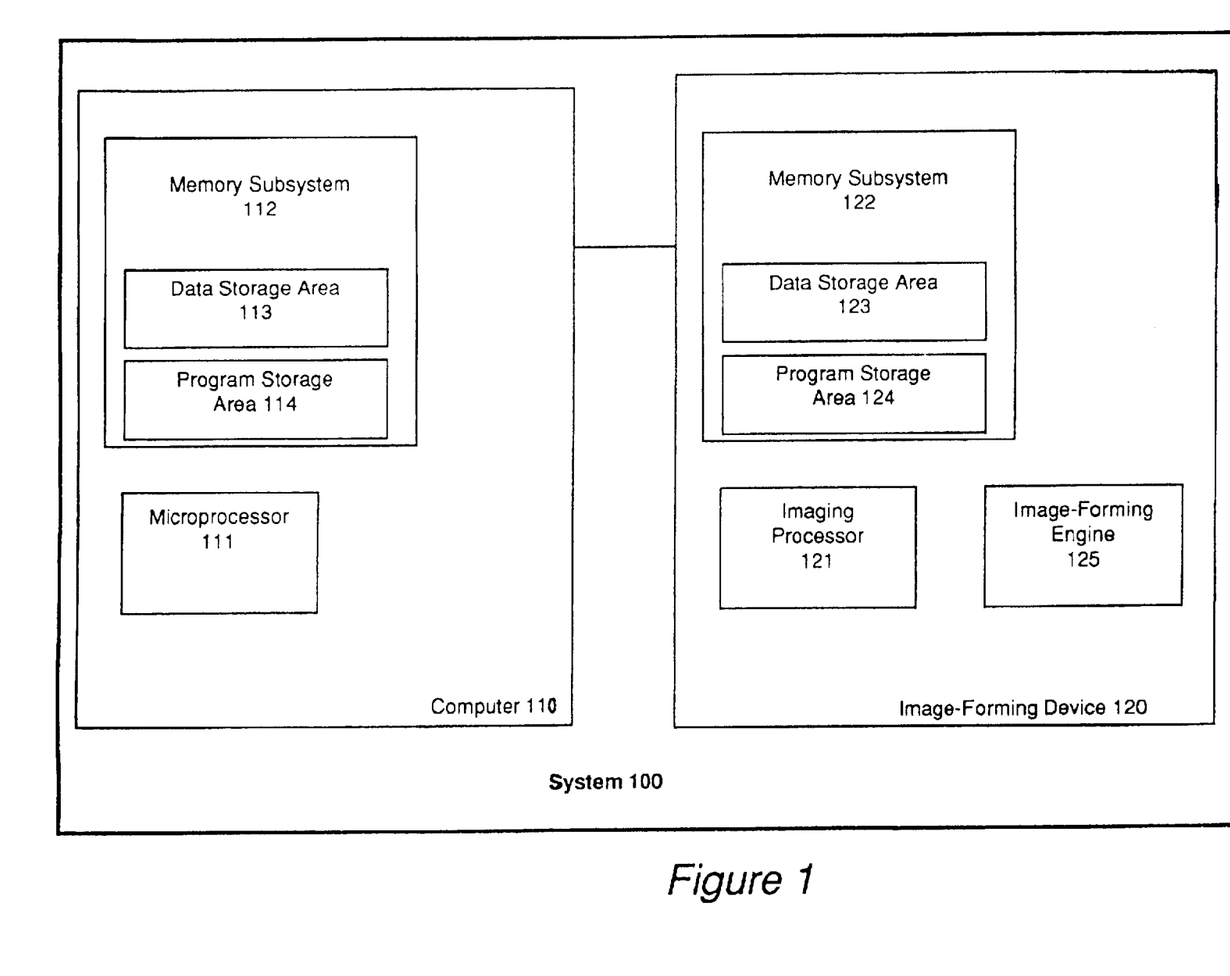
FIG. 1 is a block diagram of an image processing system in accordance with the present invention.

Referring now to FIG. 1, there is shown an image processing system 100 in accordance with the present invention. The major components of system 100 include a computer 110 and an image forming device 120. Computer 110 includes a microprocessor 111 and a memory subsystem 112, including a data storage area 113 and a program storage area 114. Image-forming device 120 includes an imaging processor 121, a memory system 122 having a data storage area 123 and a program storage area 124, and an image forming engine 125.

In a preferred embodiment, computer 110 and image-forming device 120 are implemented by conventional hardware, programmed for operation as described herein. Specifically, one preferred embodiment implements computer 110 by a model 8100/110 computer produced by Apple Computer and implements image-forming device 120 by a model 835 RSH color printer produced by Seiko Instruments Inc.

Memory subsystem 112 is implemented conventionally through random-access memory and disk memory devices integrated with computer 110. As indicated in FIG. 1, a portion of such memory is used for data storage (113) and a portion is used for program storage (114). Similarly, the memory subsystem 122 of image-forming device 120 is implemented conventionally using random access memory and disk storage devices.

The imaging processor 121 and image-forming engine 120 of image-forming device 120 are also conventional devices. Using the example of the Seiko Instruments model 835 RSH color printer, imaging processor 121 is implemented using a model 68340 microprocessor produced by Motorola Inc., and image-forming engine 125 is implemented using a model 835 thermal-wax transfer/dye sublimation print engine produced by Seiko Instruments Inc.

Figure 2:
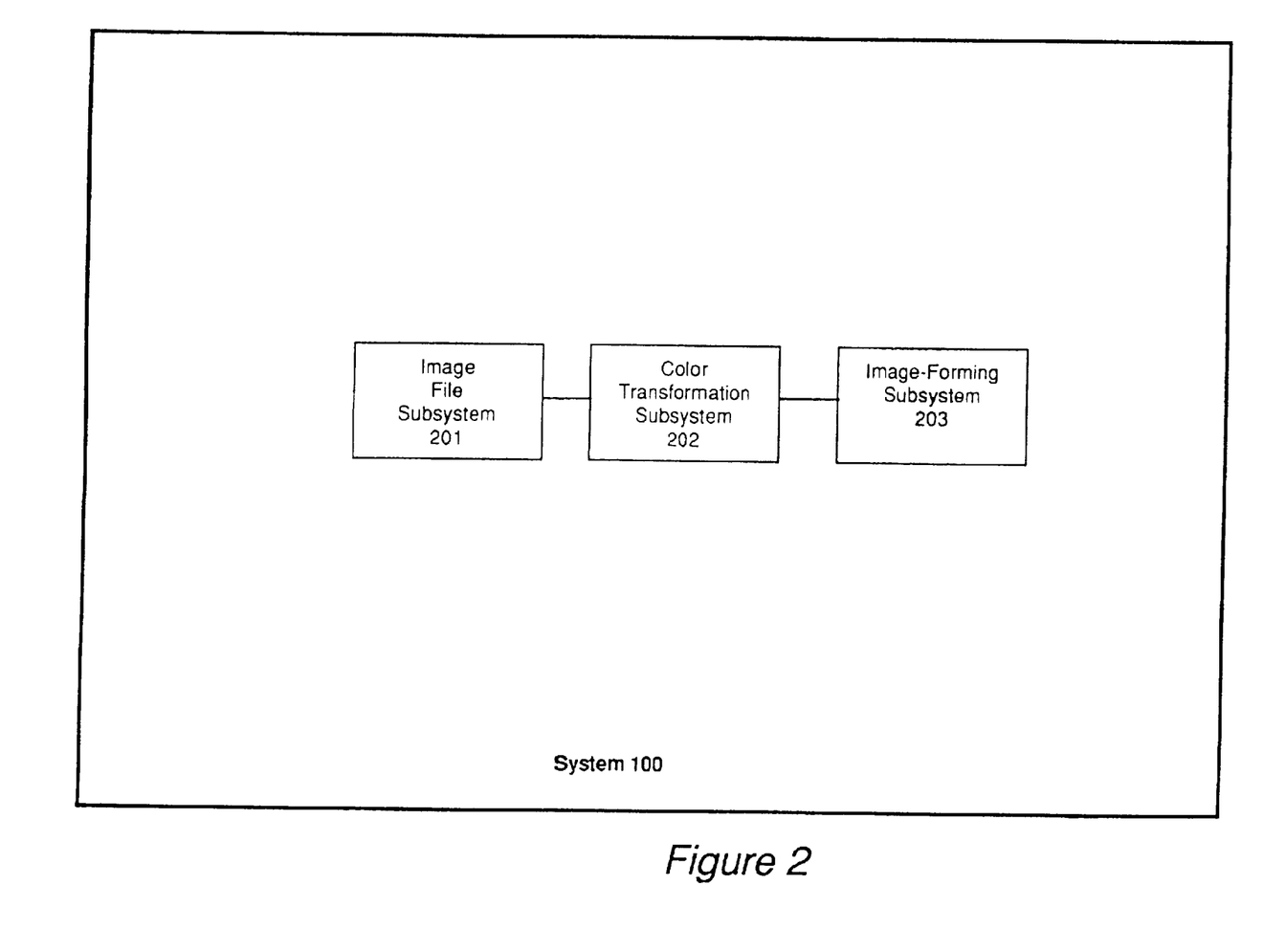
FIG. 2 is a functional block diagram of the system illustrated in FIG. 1.

Referring now to FIG. 2, there is illustrated a functional block diagram of system 100. Functionally, system 100 includes three major pertinent subsystems: an image file subsystem 201, a color transformation subsystem 202, and an image-forming subsystem 203. Image file subsystem 201 provides signals representative of an input image, for example digital signals corresponding to PostScript language commands for drawing a color image, with the colors described in the RGB color space.

Color transformation subsystem 202 converts the signals from image file subsystem 201 into a form that can be used by image-forming subsystem 203 to produce an image. To illustrate, if image-forming subsystem 203 is expecting raster imaging signals for printing using a conventional four color separation (CMYK) mechanism, then color transformation subsystem 202 transforms the RGB signals from image file subsystem 201 into CMYK signals usable by image-forming subsystem 203.

Because both computer 110 and image-forming device 120 include programmable, general-purpose microprocessors (111, 121, respectively), many of the functions of subsystems 201–203 may be performed either by computer 110 or by image-forming device 120. In a preferred embodiment, image file subsystem 201 is implemented by computer 110, color transformation subsystem 202 is implemented by computer 110, and image-forming subsystem is implemented by image-forming device 120.

Figure 3:
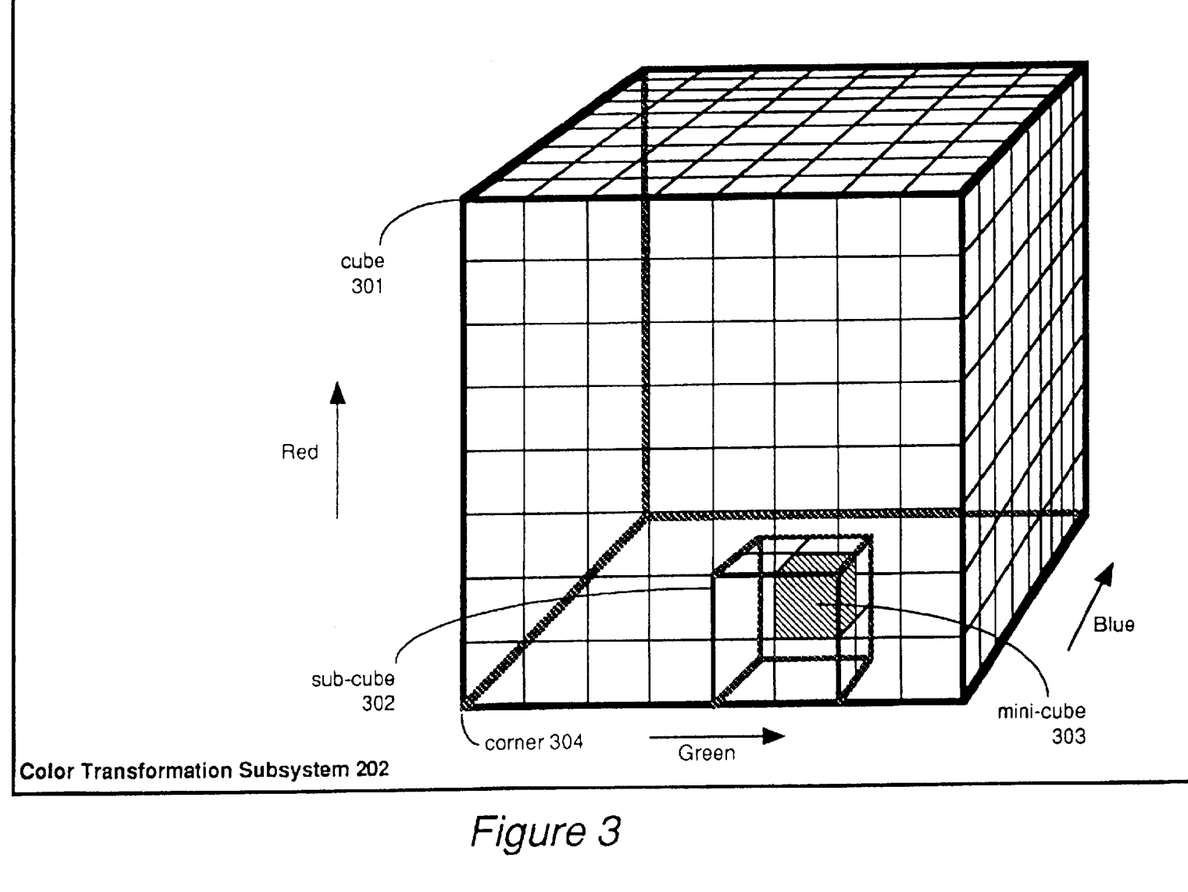
FIG. 3 is an illustration of a memory structure known as a "cube," implemented by the color transformation subsystem illustrated in FIG. 2.

Referring now to FIG. 3, there is illustrated an exemplary memory structure 301 known as a "cube" that is implemented by color transformation subsystem 202. Cube 301 is illustrated in FIG. 3 in simplified form for purposes of explanation, as will be evident by the description herein. In a preferred embodiment, cube 301 is a portion of data storage area 113 in computer 110 and is organized as a multi-dimensional table. For some combinations of possible values of red, green, and blue signals there is a corresponding location (or address) of cube 301, as detailed below.

For illustrative purposes, the lower-left hand corner 304 of the front of cube 301 may be considered an origin point corresponding to red, green, and blue signals having corresponding values 0, 0, and 0. If each grid line shown on cube 301 represents an increment of one for the corresponding red, green, and blue signals, then cube 301 can address red, green, and blue values ranging from (0,0,0) to (8,8,8). Thus, the lower-left hand corner of the front of the element labeled mini-cube 303 corresponds to an RGB signal of (1,5,0).

Each location where grid lines intersect, such as (1,5,0), represents the location of a memory cell in data storage area 123. As discussed in greater detail below, the contents of that memory cell contains information pertinent to the desired transformation of color information from the RGB color space to a different color space used by system 100. For instance, if cube 301 were to be intended for transformation from RGB to CMYK, then the memory cell addressed by (1,5,0) might contain the values (95, 22, 128, 0), which might be the description of the same color in CMYK color space as is represented by (1,5,0) in RGB color space.

To reduce memory requirements cube 301 does not include grid intersections for every possible value of R, G and B. To illustrate, an input image might include a color represented by an RGB signal of (1.2, 5.6, 0.3). Furthermore, to reduce computational requirements, systems 100 does not initialize operations by pre-determining the corresponding CMYK values that should be stored in each memory cell of cube 301. Rather, the processing described in connection with FIGS. 3 and 4 permits all necessary transformations to be made without fully populating cube 301 with transformation entries, and without the need for an intractable number of grid lines.

It should be noted that cube 301 of FIG. 3 is simplified in two ways. First, in a typical operating environment for system 100, transformations are from input signals describing color in input color spaces that may be defined in more than three dimensions, rather than the three dimensions of the RGB color space, to output color spaces that may range from one dimension (e.g., black and white) to more than four dimensions (for so-called "high fidelity" printing systems that use more than four inks). RGB is used as an example input color space simply because a three dimensional cube is easier to illustrate for instructional purposes than a cube having four or more dimensions (i.e., a "hypercube"). It should be recognized that use herein of the term "cube" refers, for convenience, to a multi-dimensional memory structure that may or may not be three-dimensional. Second, the use of only eight grid lines each for R, G, and B is more coarse than is implemented in a preferred embodiment; in a preferred embodiment 32 grid points are provided in each of the n input dimensions of the cube. It should also be recognized that in alternate embodiments, additional information, such as screening parameters, could be addressed and stored using cube 301.

In general, transformations among the color spaces supported by system 100 are not linear transformations, but are complex relationships. Accordingly, computing an output color space signal value from a set of input color space signal values is often a computationally intensive task. Therefore, to minimize the processing overhead imposed by such transformation, system 100 attempts to minimize the number of such transformational computations that must be made.

One conventional step in minimizing the number of computations is through the use of a multi-dimensional look-up table such as cube 301. Known systems determine output signals for each input signal value represented by each intersection of grid lines of cube 301. If an input signal does not fall precisely on a grid line intersection, conventional interpolation techniques are used to determine an output signal.

Figure 4:
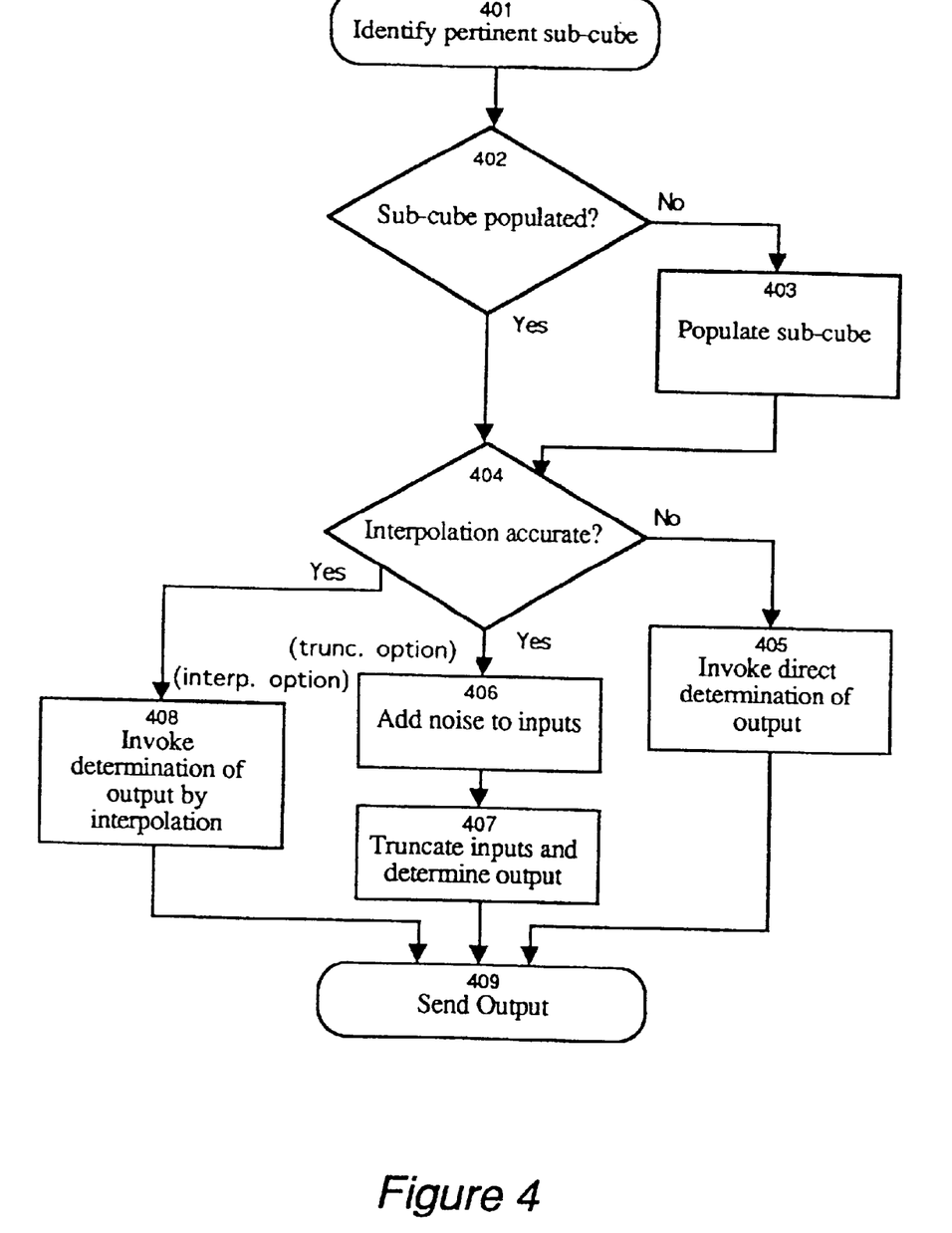
FIG. 4 is a flow chart of processing in accordance with the present invention.

Referring now also to FIG. 4, system 100 improves upon the conventional techniques in a number of ways. First, system 100 does not commence by determining output signals corresponding to each grid line intersection of cube 301, but only determines output signals for some relevant subset of intersections. Second, system 100 approximates interpolation by the introduction of a randomization function and a truncation function.

Specifically, cube 301 is divided into a number of sub-cubes, e.g., 302. Each sub-cube, in turn, is defined as including a number of mini-cubes, e.g., 303. In a preferred embodiment, each mini-cube has a length equal to a distance between adjacent grid-lines in each dimension. When an input signal is applied to color transformation subsystem 202 for transformation into another color space, processing is performed as illustrated in FIG. 4.

Processing commences by identifying 401 the sub-cube with which the input signal corresponds. Using the example discussed above, the RGB input signal (1.2, 5.6, 0.3) would correspond with (i.e., be "inside") sub-cube 302. Next, a check 402 is made to determine whether any space has yet been reserved for sub-cube 302 in data storage area 123 and whether the memory cells for each grid point of the sub-cube already contain output signal data. If so, the sub-cube is considered to be "populated" and processing continues. If not, the sub-cube is populated 403, as detailed in connection with FIG. 5, before processing continues.

Next, the mini-cube, e.g., 303, corresponding to the input signal, e.g., (1.2, 5.6, 0.3), is checked 404 to determine whether interpolation will be sufficiently accurate for that mini-cube. In a preferred embodiment, this check is made by looking up a stored Boolean value indicating the validity of interpolation for this mini-cube. These Boolean values are determined as set forth in connection with FIG. 5. If determination 404 indicates that interpolation for the current mini-cube is not accurate, conventional direct determination of the output (e.g., by computation) is invoked 405.

If determination 404 indicates that interpolation is accurate, one of two processing routes is taken. If the user of system 100 has pre-selected an option to determine output by truncation, a pseudo-random noise component is added 406 to the input signal, the input signal is then truncated 407 so as to fall directly on one of the grid line intersections, and the output signal is read from the memory cell corresponding to that grid line intersection. As the addition of the noise component and truncation are computationally trivial compared with either interpolation or direct computation, such pseudo-random selection of a mini-cube corner for an input within a mini-cube is found to provide extremely fast transformation. In practice, it is found that visually pleasing results are obtained using such noise addition and truncation when the interpolation accuracy is found to be within the predetermined threshold. In a preferred embodiment, the amplitude of the added noise is set to be at least equal to the increment value represented by the grid line spacing. A preferred embodiment uses pseudo-random noise that has a uniform probability density function, with all samples equally likely, to approximate a "linear" interpolator. It should be noted that using a different distribution of the noise to allow weighting in favor of particular grid intersections may be desirable in certain applications and alternate embodiments to, for example, more closely approximate a function that is not linear.

As noted above, a preferred embodiment uses pseudo-random noise and truncation to approximate conventional interpolation techniques. By controlling the probability distribution of the random numbers added to the signal prior to truncation, many different forms of interpolation may be approximated at greatly reduced computational complexity. In a preferred embodiment pseudo-random noise is used that has a uniform probability density function. This distribution gives an approximation to linear interpolation. In an alternate embodiment, higher order interpolants, which take into account not only the present mini-cube but adjacent mini-cubes as well, are approximated by selecting random numbers from more than one probability density function and adding the results prior to truncation. Further modifications to the probability distributions could be used to produce other effects such as global color modifications. Modifications to the correlation of the noise could be used to modify the appearance or reproduction characteristics of the resulting image. In a preferred embodiment noise with a very narrow auto-correlation function is used to minimize "graininess" in the resulting image.

If the user of system 100 has pre-selected an option to determine output by interpolation, conventional interpolation 408 is applied to determine the output. In practice, it is found that the truncation option (407) provides faster processing with satisfactory results, but some users in some applications may prefer to use interpolation, and users are thus provided with this option.

Processing is completed by sending 409 the output signal determined by direct computation (405), truncation (407), or interpolation (408) for further processing by color transformation subsystem 202 or by image forming subsystem 203, as may be applicable in any particular situation.

Figure 5:
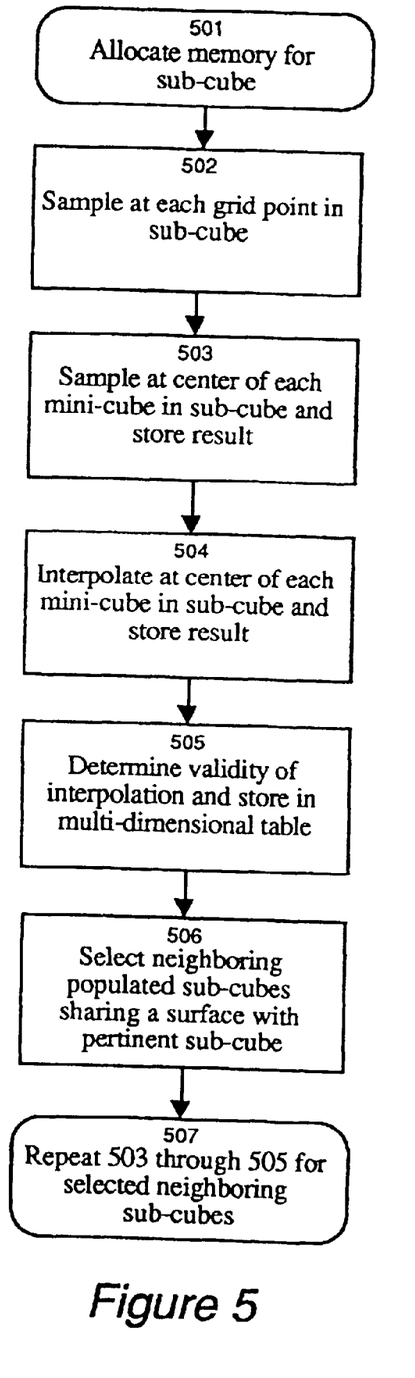
FIG. 5 is a flow chart detailing a portion of the processing illustrated in FIG. 4.

Referring now to FIG. 5, there is shown greater detail concerning processing 403 for populating a sub-cube. Such processing commences by allocating 501 memory space in data storage area 113 for the sub-cube. An output signal corresponding to the input signals for each grid point in the sub-cube is then determined 502, also known as "sampling".

Next, an output signal corresponding to the input signal for the center of each mini-cube is sampled 503, and the results are stored in a temporary memory portion of data storage area 113.

An estimated output signal for the "center" of each mini-cube is then determined 504 by interpolation and the results are stored in a temporary memory portion of data storage area 113. In a preferred embodiment, linear interpolation from all corners of the pertinent mini-cube is used, but it will be evident to those skilled in the art that other methods of interpolation, using different combinations of corners, could be used. For example, in one alternative embodiment, the output signals for all eight corners could initially be considered, the high and low corners discarded, and the output signals for the remaining 6 corners could be averaged to yield the interpolated value. Various additional known interpolation techniques could be used, for instance those disclosed in William H. Press, et al., NUMERICAL RECIPES IN C (Cambridge University Press 1992).

The validity of interpolation for each mini-cube is then determined 505 by comparing the interpolated estimate for the center of that mini-cube and the actual value for the center of that mini-cube to see how close they are. In a preferred embodiment, if the interpolated estimate is within 1.0% of the actual value, interpolation is considered accurate for that mini-cube and a Boolean value representing that fact is stored in data storage area 113. Otherwise, a Boolean value representing that the mini-cube is not amenable to interpolation is stored. In a preferred embodiment, a separate multi-dimensional table is used to store the Boolean values indicating whether interpolation is accurate for each mini-cube, but those skilled in the art will recognize that the Boolean values could alternatively be stored directly in the data structure represented by cube 301. Once a mini-cube has been checked for interpolation accuracy when the corresponding sub-cube is first populated, and the corresponding Boolean value has been stored, accuracy computations need not be performed again for that mini-cube, and the determination 404 of interpolation accuracy is made simply by examining the Boolean value that has been stored for that mini-cube.

Processing continues by selecting 506 any additional mini-cubes adjacent to the current sub-cube that are needed for interpolation, and by repeating processing 503–505 for such mini-cubes. Depending on the particular implementation of system 100, mini-cube edges at the edge of a sub-cube may be considered part of that sub-cube or part of an adjacent sub-cube, so the additional processing 506 may be required to completely populate the current sub-cube and determine interpolation validity for each of the mini-cubes thereof.

As color transformation subsystem 202 continues operation on further input signals, other sub-cubes may be populated as required by the input signals. In a preferred embodiment, should memory subsystem not contain sufficient room for population of additional sub-cubes, the space allocated for sub-cubes that were previously needed is released for re-use. The determination of which sub-cubes to release is based both on recency of use and on whether the current input signal is close to the sub-cube (indicating that subsequent input signals may again be within the sub-cube) or not. Thus, the available space in memory subsystem 112 is cached so that the sub-cubes most likely to be used for future input signals are maintained as populated.

Please refer to the computer program listing appendix in a file named CSB1056 on the compact disc provided to the U.S. Patent & Trademark Office.

What is claimed is:

1. A system for processing images, based on using a cube with a plurality of sub-cube portions to transform any possible source color image values to target color image values, the system comprising:

an image file subsystem providing at least one source color image value representing a source color image;

a color transformation subsystem operatively coupled to the image file subsystem and accepting as input the at least one source color image value and producing at least one target color image value therefrom; and an image forming subsystem operatively coupled to the color transformation subsystem and forming a physical manifestation of the source color image from the produced at least one target color image value, the color transformation subsystem being configured to:

define a memory area for at least one sub-cube portion as representative of the at least one source color image value;

determine target color values corresponding to the defined sub-cube portion to populate the memory area; and determine the at least one target color image value in response to the determined target color values;

such that at least the target color values of one sub-cube portion have been determined by sampling, but not by interpolation, wherein the color transformation subsystem is further configured to divide the sub-cube portion into mini-cube portions and to determine target color values corresponding to each mini-cube portion and wherein the color transformation subsystem is configured to determine an accuracy of interpolation for each of the mini-cubes; and wherein the color transformation subsystem is configured to determine the target color values in a first manner in response to an accuracy of interpolation exceeding a predetermined threshold and to determine the target signal in a second manner in response to the accuracy of interpolation not exceeding a predetermined threshold.

2. A system for processing images, based on using a cube with a plurality of sub-cube portions to transform any possible source color image values to target color image values, the system comprising:

an image file subsystem providing at least one source color image value representing a source color image;

a color transformation subsystem operatively coupled to the image file subsystem and accepting as input the at least one source color image value and producing at least one target color image value therefrom; and an image forming subsystem operatively coupled to the color transformation subsystem and forming a physical manifestation of the source color image from the produced at least one target color image value, the color transformation subsystem being configured to:

define a memory area for at least one sub-cube portion as representative of the at least one source color image value;

determine target color values corresponding to the defined sub-cube portion to populate the memory area; and determine the at least one target color image value in response to the determined target color values;

such that at least the target color values of one sub-cube portion have been determined by sampling, but not by interpolation, wherein the color transformation subsystem is configured to add a pseudo-random noise signal to the at least one source color image value to yield a noise-added source image signal, and to truncate the noise-added source image signal, thereby significantly reducing the amount of computation required; and wherein the color transformation subsystem is configured to determine the target color values in a first manner in response to an accuracy of interpolation exceeding a predetermined threshold and to determine the target signal in a second manner in response to the accuracy of interpolation not exceeding a predetermined threshold.

3. A system as in claim 2, wherein said pseudo-random noise signal has a uniform probability density function.

4. A system for processing images, based on using a cube with a plurality of sub-cube portions to transform any possible source color image values to target color image values, the system comprising:

an image file subsystem providing at least one source color image value representing a source color image;

a color transformation subsystem operatively coupled to the image file subsystem and accepting as input the at least one source color image value and producing at least one target color image value therefrom; and an image forming subsystem operatively coupled to the color transformation subsystem and forming a physical manifestation of the source color image from the produced at least one target color image value, the color transformation subsystem being configured to:

define a memory area for at least one sub-cube portion as representative of the at least one source color image value;

determine target color values corresponding to the defined sub-cube portion to populate the memory area; and determine the at least one target color image value in response to the determined target color values;

such that at least the target color values of one sub-cube portion have been determined by sampling, but not by interpolation, wherein the color transformation subsystem is configured to determine the target color values in a first manner in response to an accuracy of interpolation exceeding a predetermined threshold and to determine the target signal in a second manner in response to the accuracy of interpolation not exceeding a predetermined threshold, and wherein the first manner includes adding pseudo-random noise followed by truncation, thereby significantly reducing the amount of computation required.

5. A system as in claim 4, wherein said pseudo-random noise has a uniform probability density function.

6. A method of processing a source color image with at least one source color image value to produce a target color image with at least one target color image value, based on using a cube with a plurality of sub-cube portions to transform any possible source color image values to target color image values, the method comprising the steps of:

defining a memory area for at least one sub-cube portion as representative of the at least once source color image value;

determining target color values corresponding to the defined sub-cube portion to populate the memory area;

determining the at least one target color image value in response to the determined target color values;

dividing the sub-cube portion into mini-cube portions and determining target color values corresponding to each mini-cube portion; and determining an accuracy of interpolation for each of the mini-cube portions, wherein at least the target color values of one sub-cube portion have been determined by sampling, but not by interpolation; and wherein the color transformation subsystem is configured to determine the target color values in a first manner in response to an accuracy of interpolation exceeding a predetermined threshold and to determine the target signal in a second manner in response to the accuracy of interpolation not exceeding a predetermined threshold.

7. A method of processing a source color image with at least one source color image value to produce a target color image with at least one target color image value, based on using a cube with a plurality of sub-cube portions to transform any possible source color image values to target color image values, the method comprising the steps of:

defining a memory area for at least one sub-cube portion as representative of the at least once source color image value;

determining target color values corresponding to the defined sub-cube portion to populate the memory area; and determining the at least one target color image value in response to the determined target color values, wherein at least the target color values of one sub-cube portion have been determined by sampling, but not by interpolation and wherein determining the at least one target color image value comprises adding a pseudo-random noise signal to the at least one source color image value to yield a noise-added source color image value, and truncating the noise-added source color image value, thereby significantly reducing the amount of computation required; and wherein the color transformation subsystem is configured to determine the target color values in a first manner in response to an accuracy of interpolation exceeding a predetermined threshold and to determine the target signal in a second manner in response to the accuracy of interpolation not exceeding a predetermined threshold.

8. A system as in claim 7, wherein said pseudo-random noise signal has a uniform probability density function.

9. A method of processing a source color image with at least one source color image value to produce a target color image with at least one target color image value, based on using a cube with a plurality of sub-cube portions to transform any possible source color image values to target color image values, the method comprising the steps of:

defining a memory area for at least one sub-cube portion as representative of the at least once source color image value;

determining target color values corresponding to the defined sub-cube portion to populate the memory area;

determining the at least one target color image value in response to the determined target color values, determining the target signal in a first manner if an accuracy of interpolation exceeds a predetermined threshold and determining the target color values in a second manner of accuracy of interpolation does not exceed a predetermined threshold, wherein the first manner includes adding pseudo-random noise followed by truncation, thereby significantly reducing the amount of computation required.

10. A system as in claim 9, wherein said pseudo-random noise has a uniform probability density function.

* * * * *